US012623616B2

(12) United States Patent
Forsgren et al.

(10) Patent No.: US 12,623,616 B2
(45) Date of Patent: May 12, 2026

(54) CORNER PART FOR A WIPER PANEL ASSEMBLY FOR A GROUND VEHICLE

(71) Applicant: Volvo Truck Corporation, Gothenburg (SE)

(72) Inventors: Johan Forsgren, Gothenburg (SE); Jacob Raine, Tvååker (SE); Anders Tenstam, Öjersjö (SE)

(73) Assignee: Volvo Truck Corporation, Gothenburg (SE)

( * ) Notice: Subject to any disclaimer, the term of this patent is extended or adjusted under 35 U.S.C. 154(b) by 392 days.

(21) Appl. No.: 18/346,360

(22) Filed: Jul. 3, 2023

(65) Prior Publication Data

US 2024/0017771 A1     Jan. 18, 2024

(30) Foreign Application Priority Data

Jul. 13, 2022    (EP) ..................................... 22184788

(51) Int. Cl.
B60R 13/07 (2006.01)
B62D 25/08 (2006.01)
B62D 35/00 (2006.01)
(52) U.S. Cl.
CPC ............ B60R 13/07 (2013.01); B62D 25/081 (2013.01); *B62D 35/005* (2013.01)
(58) Field of Classification Search
CPC .............................. B60R 13/07; B62D 25/081
USPC ...................................................... 296/192
See application file for complete search history.

(56) References Cited

U.S. PATENT DOCUMENTS

| | | | | |
|---|---|---|---|---|
| 5,145,457 A | * | 9/1992 | Tanigaito | B62D 25/081 |
| | | | | 296/192 |
| 9,745,000 B2 | * | 8/2017 | Barreiro | B60Q 1/0483 |
| 11,377,155 B2 | * | 7/2022 | Ishiyama | B62D 25/081 |
| 2014/0117722 A1 | * | 5/2014 | Lacroix | B62D 25/081 |
| | | | | 296/192 |
| 2014/0306480 A1 | | 10/2014 | Sasaki | |

FOREIGN PATENT DOCUMENTS

| | | |
|---|---|---|
| CN | 112706705 A | 4/2021 |
| JP | 2006035943 A | 2/2006 |
| JP | 2020001508 A | 1/2020 |

OTHER PUBLICATIONS

English translation of JP 2006-035943; retrieved via Patent Translate located at www.epo.org. (Year: 2025).*
European Search Report for European Patent Application No. EP22184788, completed Dec. 20, 2022, 2 pages.

* cited by examiner

*Primary Examiner* — Jason S Daniels
(74) *Attorney, Agent, or Firm* — Withrow & Terranova, PLLC

(57)    ABSTRACT

A corner part for a wiper panel assembly for a ground vehicle, the corner part comprising an outside panel, having an outside face and an inside face both extending substantially parallel to an upward direction of the corner part; and a drain, having an outlet opening at the outside face, an inlet located at the inside face and opening at the inside face in the upward direction, and a channel, connecting the inlet to the outlet.

11 Claims, 7 Drawing Sheets

CORNER PART FOR A WIPER PANEL ASSEMBLY FOR A GROUND VEHICLE

RELATED APPLICATIONS

The present application claims priority to European Patent Application No. 22184788.2, filed on Jul. 13, 2022, and entitled "CORNER PART FOR A WIPER PANEL ASSEMBLY FOR A GROUND VEHICLE," which is incorporated herein by reference in its entirety.

TECHNICAL FIELD

The disclosure relates generally to the technical fields of vehicle body parts and draining of liquids such as rainwater. In particular aspects, the disclosure relates to a corner part for a wiper panel assembly for a ground vehicle, a vehicle cab and a ground vehicle.

The disclosure can be applied in heavy-duty vehicles, such as trucks, buses, and construction equipment, or even in passenger cars or other vehicle. Although the disclosure will be described with respect to a particular vehicle, the disclosure is not restricted to any particular vehicle.

BACKGROUND

The cab of known vehicles such as trucks, coaches or buses usually includes a wiper panel assembly. The wiper panel assembly is located at the front of the vehicle, between the windscreen and the front panels having the front grilles for cooling the engine. The wiper panel assembly is adjacent to a bottom edge of the windscreen. The windshield wipers are often implanted in front of the wiper panel assembly or at the back thereof. The wiper panel assembly usually has two corner parts, one at each lateral ends thereof, positioned adjacent to two corresponding bottom corners of the windscreen.

A disadvantage of known wiper panel assemblies is that, when the vehicle reaches cruise speed, rainwater may strip from the corners of the wiper panel assembly and end up on the side windows, causing reduction of the driver's visibility by the water flowing along the side window and, over time, by accumulation of dirt carried by the rainwater.

SUMMARY

The disclosure proposes to improve a driver's visibility and/or to reduce the flowing of water along an area of a ground vehicle to be avoided, such as a side window of the ground vehicle.

An aspect of the disclosure concerns a corner part for a wiper panel assembly for a ground vehicle, the corner part comprising an outside panel, having an outside face and an inside face both extending substantially parallel to an upward direction of the corner part. The corner part further comprises a drain, having: an outlet, opening at the outside face, an inlet, located at the inside face and opening at the inside face in the upward direction, and a channel, connecting the inlet to the outlet. When in use, the upward direction may be oriented upwards. Hereby, a technical effect includes that, when in use, in particular at cruise speed such as 60-90 kph (kilometers per hour), drained liquids including rainwater and/or windshield washer may be received at the inlet of the drain, carried to the outlet via the channel and strip outside of the drain from the outlet. An advantage is that the drain may be configured to direct the flow of drained liquids along a desired path and/or to strip according to a desired trajectory. In particular, this may reduce the risk of drained liquids reaching an area of the ground vehicle to be avoided, such as a side window of the ground vehicle. In use, at a top edge of the outside panel, the inside face may be facing or be adjacent to a bottom corner of a windscreen of the ground vehicle, while the outside face may be oriented towards the outside of the ground vehicle. The corner part may constitute a part of an outer shell of the cab of the ground vehicle.

In certain examples, the inlet is located in the upward direction relative to the outlet. In other words, the inlet is located above the outlet, considering the orientation of the ground vehicle when the ground vehicle stands or travels on a road. Hereby, a technical effect is that the inlet may be positioned higher for better catching of drained liquids, in particular coming from a windscreen of a vehicle, while the outlet may be positioned lower for releasing the drained liquids under the area of the ground vehicle to be avoided, such as the side window.

In certain examples, the outlet is located in a frontward direction relative to the inlet. Preferably, the frontward direction is perpendicular to the upward direction and substantially parallel to the outside panel. In other words, the outlet is located forward relative to the inlet, considering the forward direction of travel of the ground vehicle. Hereby, a technical effect is that the relative position of the inlet and the outlet promotes that the strip of drained liquids outgoing from the outlet is directed substantially opposite to the upward direction (i.e. downward) even at cruise speed, thus reducing the risk that the area of the ground vehicle to be avoided is reached by the strip of drained liquids, in particular if the inlet is also positioned in the upward direction relative to the outlet. In this configuration, gravity promotes flowing of the drained liquids from the inlet to the outlet as slow speeds. At higher speeds, such as cruise speed, the relative position of the inlet and the outlet may achieve that a lower pressure is obtained at the outlet compared to the inlet. This promotes that the drained liquids flow from the inlet to the outlet, since the drained liquids tend to flow from higher to lower pressure areas. The low pressure at the outlet is preferably obtained by the placement and/or the shape of the outlet. Preferably, the outlet is placed where the airflow flowing along the outside face has the highest velocity, when the vehicle is at cruise speed, so that the lowest pressure is obtained, according to Bernoulli's principle.

In certain examples, in a rearward direction perpendicular to the upward direction, the outside face and the inside face are delineated by a rear edge of the outside panel, and the corner part further comprises a lateral wing, protruding from the outside face at the rear edge, being perpendicular to the outside panel and substantially parallel to the rearward direction. In certain examples, the lateral wing is positioned along the top edge of the outside panel. In use, the lateral wing may be horizontal, or slightly inclined relative to a horizontal plane. More than one lateral wing may be provided. Hereby, a technical effect is that the lateral wing may guide a strip of drained liquids away from an area of the ground vehicle to be avoided, such as a lateral window, in particular in case the drain is clogged or saturated, or when some of the drained liquids do not enter into the drain. Preferably, the lateral wing is located in the rearward direction relative to the inlet of the drain. In certain examples, the inlet is closer to the rear edge than the outlet, i.e., the outlet is in the frontward direction relative to the inlet. In certain embodiments, two lateral wings may be provided, including an upper lateral wing for guiding the drained liquids that do not enter into the drain, and a lower lateral wing that may stabilize the flow and ensure that the flow is horizontal after the wiper panel, or at least not going upwards. Thus, drained liquids that follow the wiper panel may advantageously flow below the side window and not upon it.

In certain examples, at least one of the inlet and outlet is funnel-shaped. Hereby, a technical effect is that the inlet may be shaped as a funnel or a hopper for better catching of drained liquids and the outlet may be shaped as a funnel or a jet for better directing and shaping drained liquids flow outgoing from the drain. Another technical effect is that, when drained liquids flow from the channel to the outlet, the funnel-shaped outlet may cause a pressure decrease in the drained liquids flow at the outlet and promotes that the flowing of drained liquids is not reversed, in particular at cruise speed. In an embodiment, the funnel-shaped inlet is oriented in the upward direction. In an embodiment, the funnel-shaped outlet is oriented substantially in the rearward direction. The inlet may be funnel-shaped while the outlet is not, the outlet may be funnel-shaped while the inlet is not, or both the inlet and the outlet may be funnel-shaped. In other examples, an airfoil is formed at the outlet.

In certain examples, in the upward direction, the outside face and the inside face are delineated by a top edge of the outside panel and wherein the corner part further comprises a front wall, protruding from the top edge substantially in the upward direction, positioned close to the inlet and being oriented transversally relative to the top edge. In an embodiment, the inlet is positioned at a distance from the front wall and in the frontward direction relative to the front wall, while the front wall is positioned in the upward direction relative to the inlet. The front wall may protrude from the top edge at the lateral wing. Hereby a technical effect is that, when the ground vehicle is at cruise speed, a slight air pressure buildup may form at the front wall, i.e., over and/or at the rear relative to the inlet, as the front wall interrupts the airflow. Comparatively to the outlet, a higher air pressure may be obtained at the inlet. Thus, entrapment or suction of drained liquids into the inlet of the drain is promoted in particular at cruise speed.

In certain examples, the drain is formed integrally with the outside panel. Hereby, a technical effect is to reduce the manufacturing steps for obtaining the corner part.

In certain examples, the corner part comprises an inside part, assembled with the outside panel at the inside face thereof, the inside part forming at least one portion of the channel and of the inlet of the drain. Hereby, a technical effect is to reduce some of the manufacturing constraints for obtaining more complex or tortuous shape for the drain.

Another aspect of the disclosure concerns a vehicle cab comprising a wiper panel assembly comprising the corner part as defined above, the vehicle cab further comprising a windscreen.

In certain examples, the corner part is adjacent to a bottom corner of the windscreen and the inlet of the corner part is located at the bottom corner of the windscreen. Herein, a technical effect is that the inlet is positioned for retrieve a high amount of drained liquids that may flow along the windscreen.

Another aspect of the disclosure concerns a ground vehicle comprising the vehicle cab as defined above.

In certain examples, the ground vehicle is a truck, a coach, a bus or a van.

BRIEF DESCRIPTION OF THE DRAWINGS

With reference to the appended drawings, below follows a more detailed description of aspects of the disclosure cited as examples.

FIG. 3.

DETAILED DESCRIPTION

Aspects set forth below represent the necessary information to enable those skilled in the art to practice the disclosure.

The disclosure proposes to improve a driver's visibility and/or to reduce the flowing of water along an area of a ground vehicle to be avoided, such as a side window of the ground vehicle.

Figure 1:
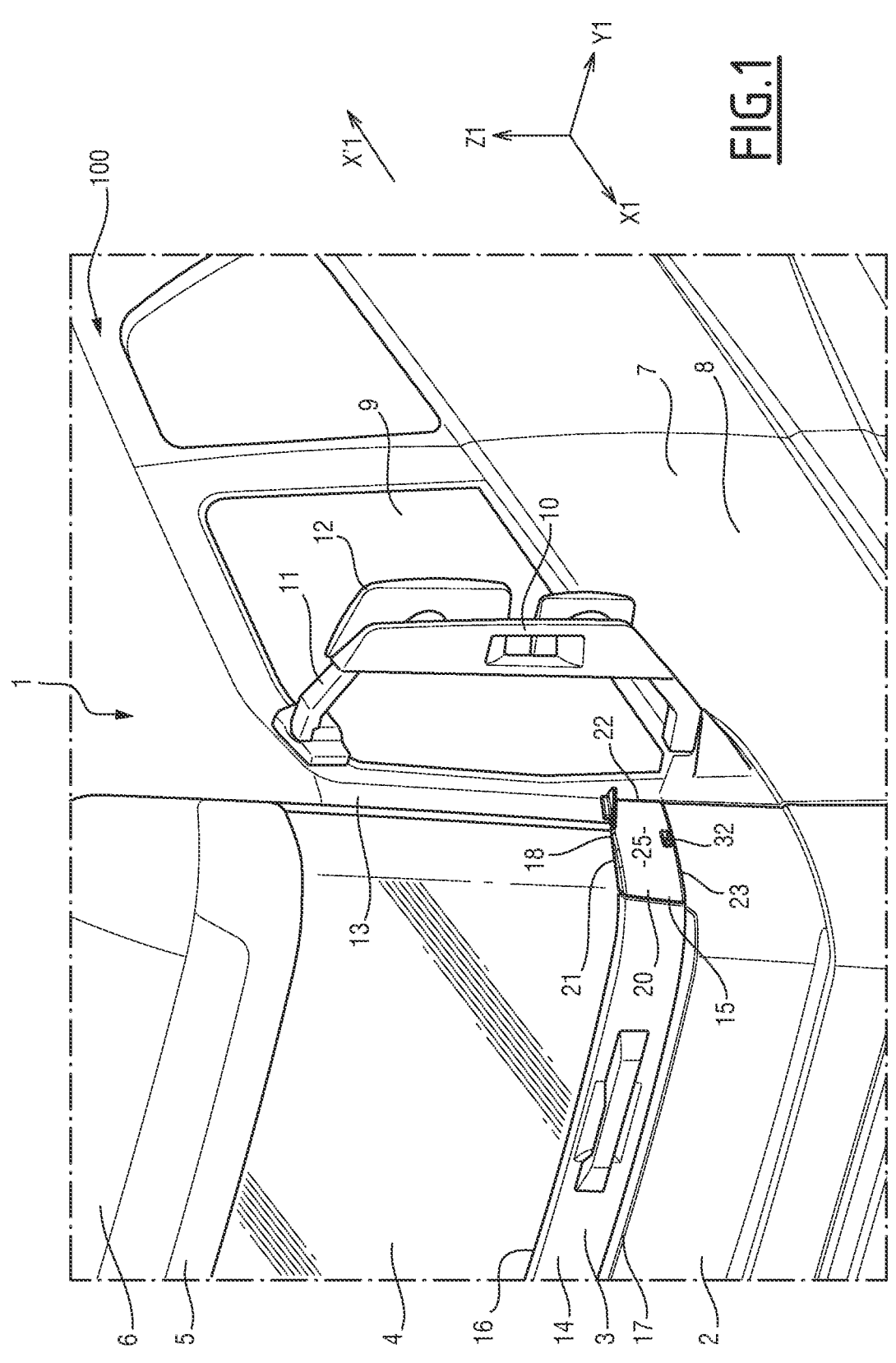
FIG. 1 is an exemplary partial perspective view of a ground vehicle according to one example.

FIG. 1 partially shows a vehicle cab 1 belonging to a ground vehicle 100. Here the ground vehicle 100 is a truck, but the ground vehicle 100 could be a coach, a bus or a van.

A frontward direction X1, a lateral direction Y1 and an upward direction Z1 are defined, fixed relative to the cab 1 and perpendicular to one another. In use of the vehicle 100, when the vehicle 100 travels straight forward, the direction X1 is directed substantially in the direction of travel. In use of the vehicle 100, the direction Z1 is directed upwards and substantially vertical and the direction Y1 is directed transversally. A rearward direction X'1 is also defined, opposite to the frontward direction X1.

At a front end of the vehicle cab 1, the vehicle cab 1 comprises, successively in the direction Z1, a front panel assembly 2, a wiper panel assembly 3, a windscreen 4, a sun visor 5 and a roof panel assembly 6. These parts are oriented substantially perpendicular to the frontward direction X1.

The front panel assembly may have front grilles provided therethrough.

Laterally, the windscreen 4 is delimited by a left lateral pillar 13 and a right lateral pillar of the cab 1, not visible in FIG. 1. The lateral pillars are oriented substantially parallel to direction Z1 and connecting the wiper panel assembly 3 to the roof panel assembly 6.

The wiper panel assembly 3 comprises, successively along direction Y1, a right corner part, a central part 14 and a left corner part 15. Although the right corner part is not visible in FIG. 1, it has the same features compared to the left corner part 15, arranged symmetrically relative to a symmetry plane perpendicular to direction Y1. The central part 14 and the corner parts are adjacent to a bottom edge 16 of the windscreen 4, and to a top edge 17 of the front panel assembly 2. The central part 14 may carry windshield wipers, not shown in FIG. 1. The central and corner parts may consist of a single part or, as shown in FIG. 1, of assembled parts.

The central part 14 may be oriented substantially parallel to the direction X1. Each corner part has an outside panel 20, with an outside face 25, visible from the outside of the vehicle cab 1, and an inside face 26, turned towards the inside of the cab 1, not visible in FIG. 1 but visible for other illustrated examples in FIG. 4 and FIG. 7. For the left corner part 15, the outside face 25 is oriented in a direction perpendicular to the direction Z1, directed obliquely along the frontward direction X1 and/or along the lateral direction Y1. The inside face 26 is oriented opposite. The outside panel 20 may be curved around an axis substantially parallel to direction Z1, for connecting the central part 14, perpendicular to the direction X1, to the lateral side of the cab 1, perpendicular to the direction Y1. Thus, the faces 25 and 26 are curved in the same manner. The curved faces 25 and 26 of the outside panel 20 are substantially parallel to direction Z1 and are delineated by a top edge 21 in direction Z1, a rear edge 22 in direction X' 1 and a bottom edge 23 in a direction opposite to direction Z1, the edges 21, 22 and 23 belonging to the outside panel 20. The top edge 21 and the bottom edge 23 are opposite to one another, and substantially perpendicular to the upward direction Z1. The rear edge 22 connects the edges 21 and 22 and is substantially parallel to the upward direction Z1. At the rear edge 22, the faces 25 and 26 are substantially perpendicular to direction Y1.

The top edge 21 is in particular adjacent to a lateral end of the bottom edge 16 of the windscreen 4, forming a bottom corner of the windscreen 4. In particular, the top edge 21 of the corner part 15 is adjacent to a right bottom corner 18 of the windscreen 4. The top edge 21 is preferably positioned in the direction X1 relative to the windscreen 4 so that a gap is defined between the top edge 21 and the windscreen 4, used as a gutter for drained liquids, in particular including rainwater and/or windshield washer fluid.

Along direction Z1, each corner part connects the front panel assembly 2 to one of the lateral pillars. In particular, the corner part 15 connects the front panel assembly 2 to the lateral pillar 13. Thus, the bottom edge 23 is adjacent to the front panel assembly 2, while the edge 21 is adjacent to the lateral pillar 13.

At a left lateral side of the vehicle cab 1, the vehicle cab 1 comprises a door 7, including, successively in the direction Z1, a door panel 8 and a side window 9, and a mirror assembly 10, preferably carried by the door 7, including a minor arm 11 carrying mirrors 12. When closed, the door 7, including the door panel 8 and the side window 9, is substantially perpendicular to direction Y1. The minor assembly 10 protrudes from the door 7 substantially in the direction Y1 and is for example attached at a door front pillar of the door 7, said door front pillar being directed substantially parallel to direction Z1 and delimiting the side window 9 in the direction X1. In the direction Z1, the lateral window 9 may extend from the wiper panel assembly 3 to a top edge of the windscreen 4, along the lateral pillar 13.

At a right lateral side of the vehicle cab 1, similar features than on the left side may be provided symmetrically.

Preferably, each corner part connects the central part 14 to the front pillar of the door of the lateral side. In particular, the corner part 15 connects the central part 14 to the front pillar of the door 7. Thus, the rear edge 22 is preferably adjacent to the front pillar of the door 7, or to the side window 9. The outside panel 20 is positioned substantially at the same height than a bottom of the side window 9, along direction Z1.

FIGS. 2, 3, 4 and 5 show more detailed illustrations of the corner part 15, according to an example.

Figure 2:
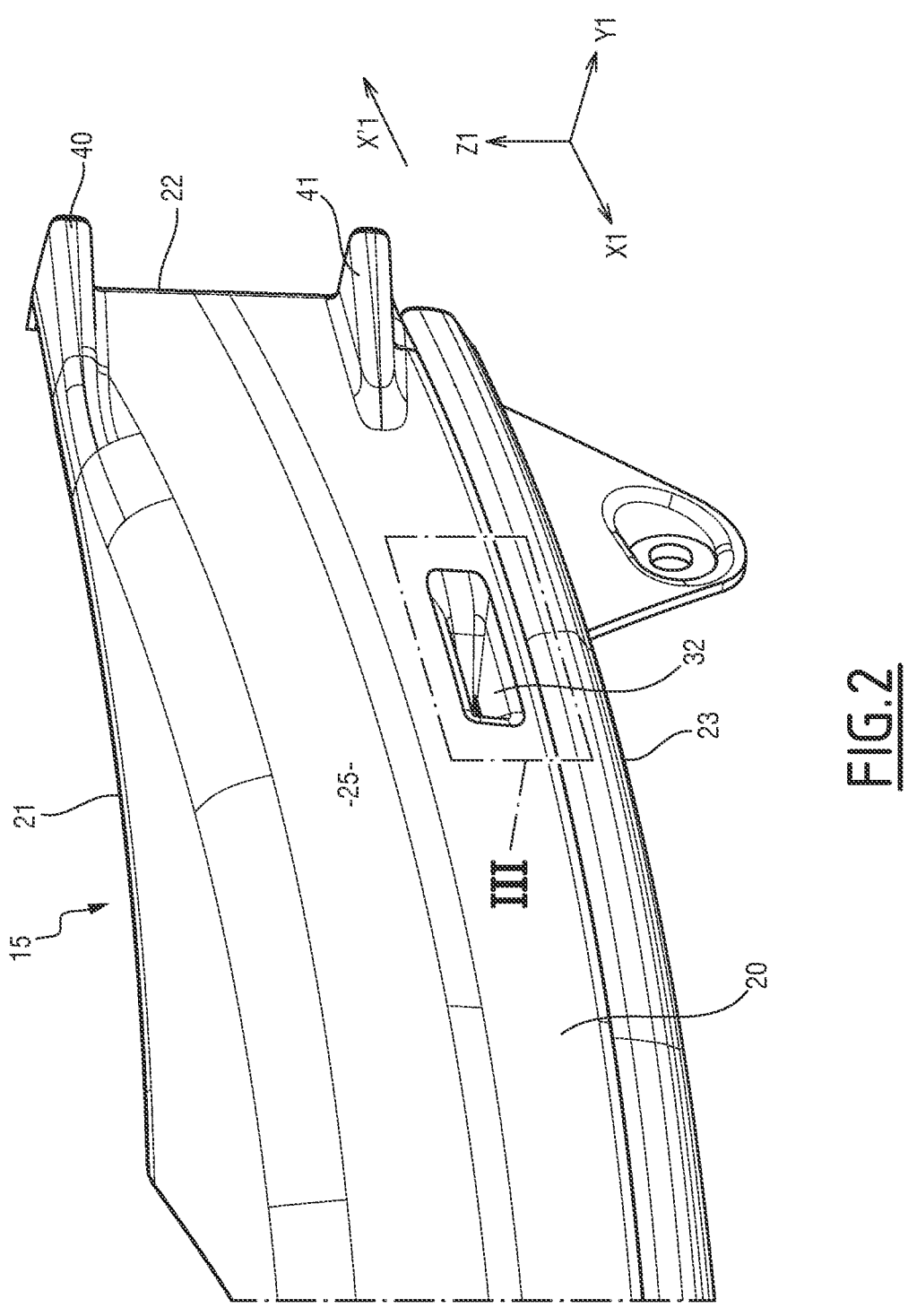
FIG. 2 is an exemplary partial perspective view of a corner part of a wiper panel assembly for the ground vehicle of FIG. 1, according to one example.

The outside panel 20 of the corner part 15, with the edges 21, 22 and 23, and the outside face 25, are best visible in FIG. 2. The inside face 26 of the outside panel 20 is visible in FIG. 4.

As for this example, the outside panel 20 may be integral with an outside panel of the central part 14 of the wiper panel assembly 3. In this example, the corner part 15 also comprises an inside part 24 assembled with the outside panel 20 and best visible in FIG. 4 and in FIG. 5. The inside part 24 is assembled at the inside face 26 of the outside panel 20, so that the outside panel and the inside part 24 are fixed to one another. FIG. 5 shows the inside part 24 without the outside panel 20.

The inside part 24 forms a gutter 29, at the inside face 26 along the top edge 21. The gutter 29 is to be fitted between the windscreen 4 and the outside panel 20, along the bottom edge 16 of the windscreen, from the central part 14 of the wiper panel assembly 3 to the corner 18 of the windscreen 4. The gutter 29 forms a bottom of the gap defined between the top edge 21 and the bottom edge 16 of the windscreen 4, for retrieving the drained liquids, in particular including rainwater and/or windshield washer fluid.

Figure 4:
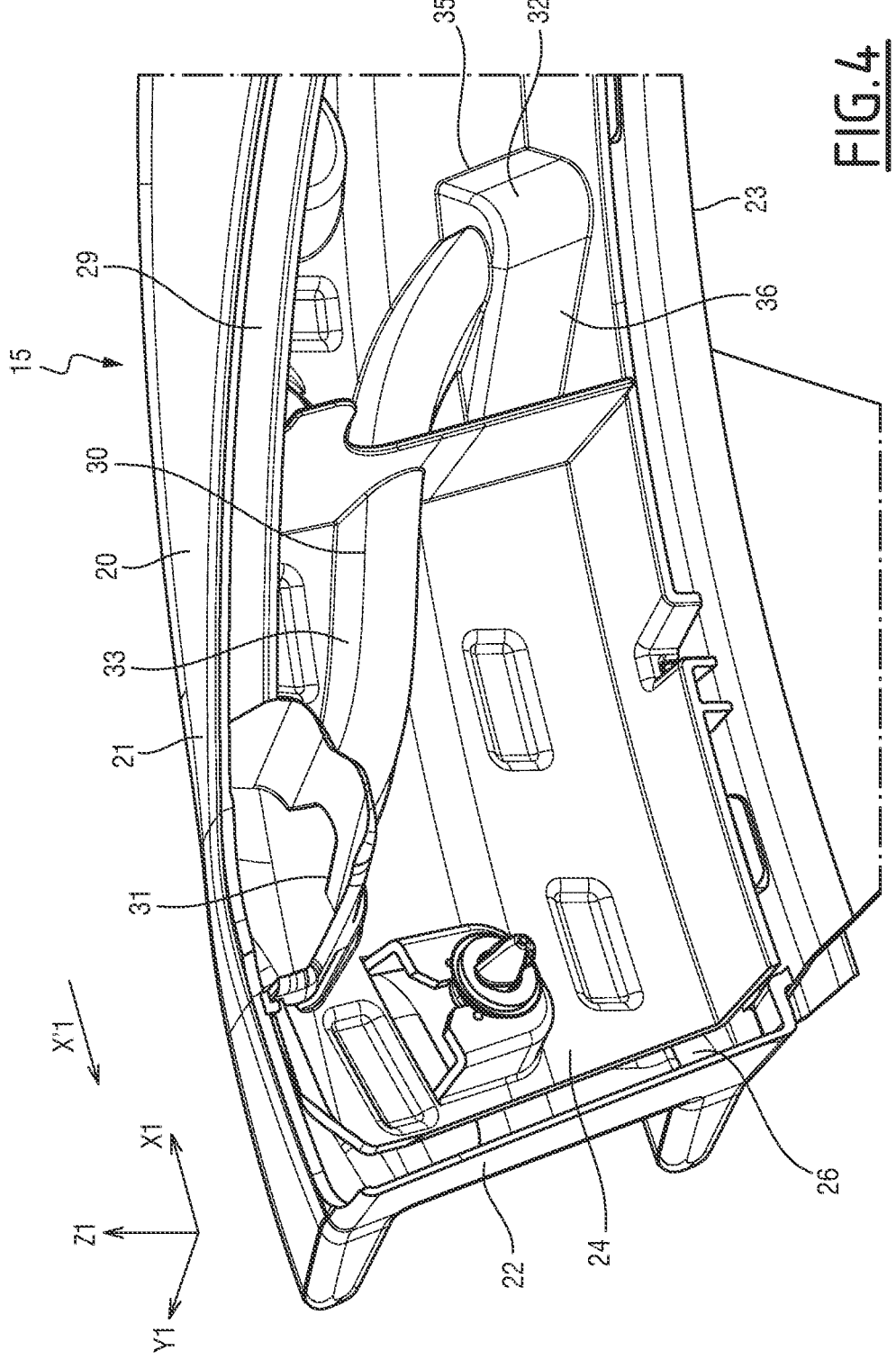
FIG. 4 is another exemplary partial perspective view of the corner part of FIG. 2.
Figure 5:
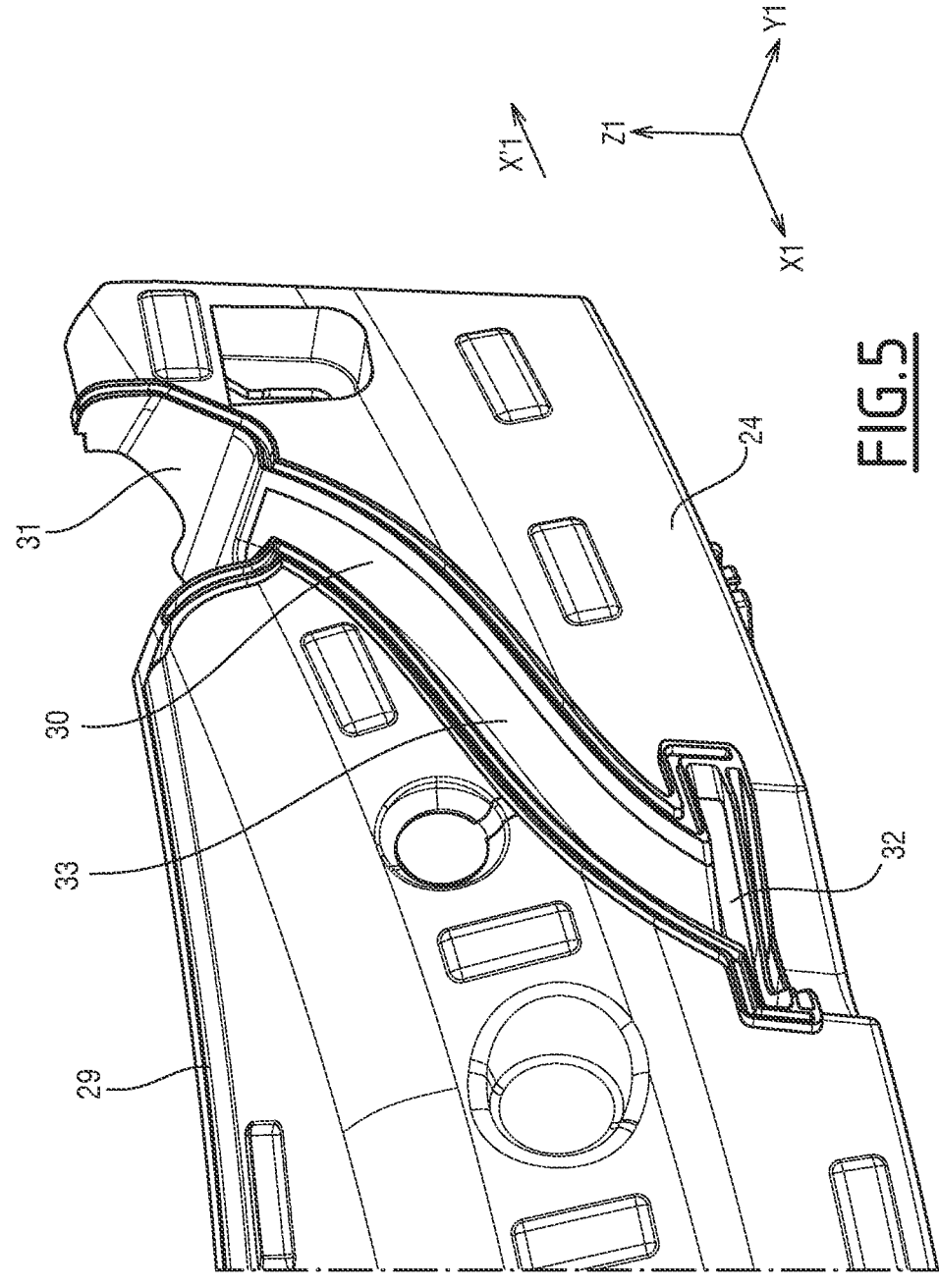
FIG. 5 is a view similar to FIG. 2 where an outside panel was removed.

As best visible in FIG. 4 and FIG. 5, the corner part 15 comprises a drain 30, having an inlet 31, an outlet 32 and a channel 33. The channel 33 connects the inlet 31 to the outlet 32, so that the drained liquids may be admitted into the drain 30 via inlet 31, then flow through the channel 33 and then exit the drain 30 via the outlet 32.

As best visible in FIG. 4 and FIG. 5, the channel 33 is partially formed by the inside part 24 and by inside face 26 of the outside panel 20. The channel 33 is a tubular duct fluidly connecting the inlet 31 and the outlet 32. The channel 33 is preferably straight or very slightly curved. The channel 33 is preferably entirely formed at the inside face 26 of the outside panel 20, so as not to be visible from the outside of the vehicle cab 1. The channel 33 is preferably oriented parallel to the directions X1 and Z1 in an oblique manner. In use, when the vehicle is at cruise speed such as 60-90 kph, the drained liquids may flow from the inlet 31 to the outlet 32 through the channel 33, in an oblique flow direction, pointing towards the frontward direction X1 and opposite to the upper direction Z1. In other words, inside the drain 30, the flow is directed frontwards and downwards. This particular orientation of the channel 33, and relative arrangement of the outlet 32 and of the inlet 31, preferably enable that the flow of drained liquids exits the outlet 32 of the drain 30 in a direction oriented opposite to the direction Z1, i.e., downwards.

The inlet 31 is an opening formed at the inside face 26, connected at one end of the channel 33 at the inside face 26. The inlet 31 opens in the upward direction Z1. As the inlet 31 opens upward, drained liquids may be received in the drain 30 by falling into the inlet 31. Preferably, the inlet 31 is funnel-shaped, for better catching of the drained liquids.

The inlet 31 is preferably formed close to the top edge 21 or at the top edge 21 and close to the rear edge 22. In use, the inlet 31 is interposed between the windscreen 4 and the inside face 26 of the outside panel 20. The inlet 31 is preferably formed at an end of the gutter 29, so as to be located at the bottom corner 18 of the windscreen 4, between the windscreen 4 and the outside panel 20. Liquids drained by the gutter 29 may flow to the end of the gutter 29 and end up into the inlet 31.

Here at least part of the inlet 31 is formed by the inside part 24. The other part of the inlet 31 is formed by the inside face 26.

The outlet 32 is an opening. The outlet 32 is connected to an end of the channel 33 at the inside face 26, opposite to the end at which the inlet 31 is formed. The outlet 32 opens at the outside face 25. In other words, the drain 30 crosses through the outside panel 20 at the outlet 32. Along the outside panel 20, the outlet 32 is located between the inlet 31 and the bottom edge 23 and the inlet 31 is located between the outlet 32 and the rear edge 22. In other words, the inlet 31 is located in the upward direction Z1 relative to the outlet 32 and the outlet 32 is located in the frontward direction X1 relative to the inlet 31. The respective positions of the inlet 31 and of the outlet 32 promote that the flow of drained liquids flows from the inlet 31 to the outlet 32, because a lower pressure may be obtained at the outlet 32 than at the inlet 31 when the vehicle 100 is at cruise speed, or even at lower speeds. The outwardly curved shape of the outside face 25 may contribute to obtain the lower pressure at the outlet 32, by Bernoulli's effect.

Figure 3:
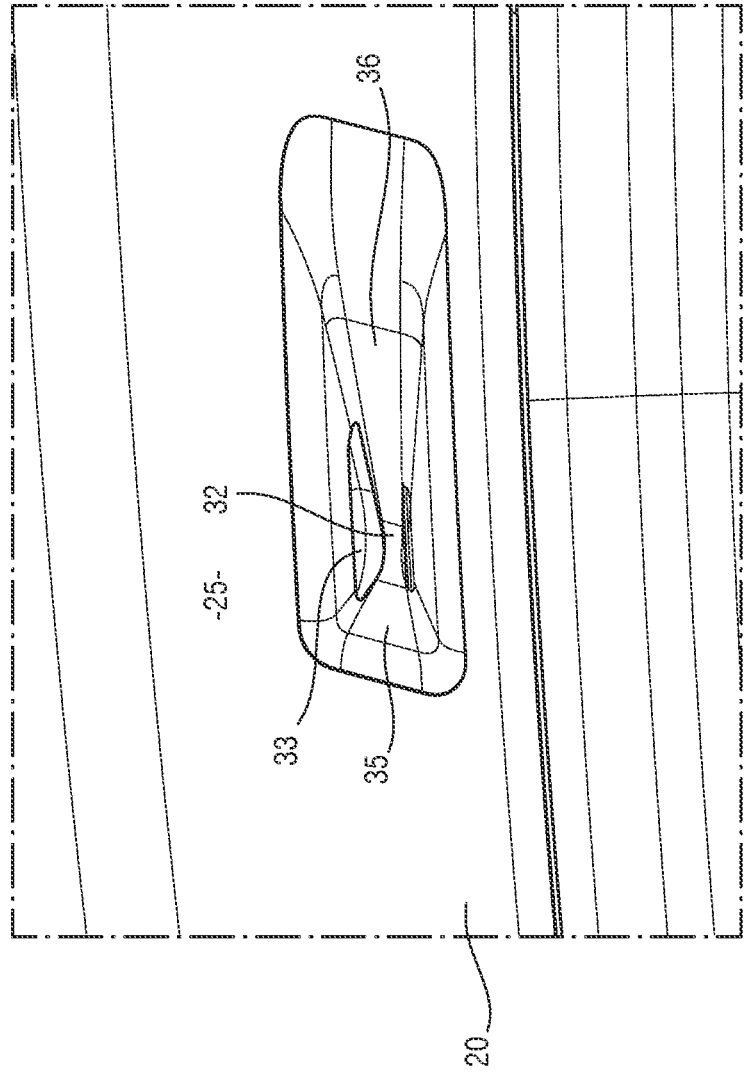
FIG. 3 is a front view of an outlet of the corner part of FIG. 2, as outlined in box III of FIG. 2.

As shown in FIG. 2, FIG. 3 and FIG. 4, the outlet 32 is preferably funnel-shaped, i.e., jet shaped, for contributing to direct the exiting flow of drained liquids downwards. The funnel-shaped outlet 32 is preferably oriented substantially in the rearward direction X'1 or lateral direction Y1.

In detail, the funnel-shaped outlet 32 may have a front wall 35 and a rear wall 36. As shown in FIG. 3, the walls 35 and 36 are formed inwards from the outside face 25, towards and end of the channel 33. The end of the channel 33 emerges between the walls 35 and 36, from upwards. Thus, the outlet 32 and the end of the channel 33 makes an elbow that impart a pressure drop to the flow of drained liquids. Starting said end of the channels 33, the walls 35 and 36 are oriented divergently. The front wall 35 is oriented substantially perpendicular to the frontward direction X1 and a rear wall 36 oriented substantially perpendicular to the lateral direction Y1, said walls 35 and 36 delineating the outlet 32 between them and defining the funnel shape of the outlet 32. Thus, at cruise speed, the wall 35 substantially protects the outlet 32 from the airflow directed in the direction X'1 along the outside face 25. However, due to the frontward position of the outlet 32, the airflow may contribute in limiting the flow of drained liquids, so that said flow of drain liquids exits the outlet 32 substantially downwards.

When drained liquids flow from the channel 33 to the outlet 32, the funnel-shaped outlet 32 and the walls 35 and 36 may cause a pressure decrease in the drained liquids flow at the outlet and may promote that the flowing of drained liquids is not reversed, in particular at cruise speed. The funnel-shaped or jet-shaped outlet 32 promotes a faster moving flow at the outlet 32 i.e., with a lower pressure.

Other features may be implemented for promoting a lower pressure at the outlet, such as forming an airfoil at the outlet 32.

The corner part 15 comprises two lateral wings 40 and 41. Here, each wing 40 and 41 is formed integrally with the outside panel 20. Each lateral wing 40 and 41 protrudes from the outside face 25 of the outside panel 20, along direction Y1. Each wing 40 and 41 is oriented perpendicular to the outside panel 20, in particular to the outside face 25 from which they protrude. Both wings 40 and 41 are positioned at the rear edge 22. The wing 40 is positioned in the direction Z1 relative to the wings 41, i.e., the wing 40 is an upper lateral wing, while the wing 41 is a lower lateral wing. The wing 40 is positioned at the top edge 21 and the wing 41 is positioned between the edges 21 and 23, or at the edge 23. Both wings 40 and 41 are directed parallel to the directions X1 and X'1, or are slightly inclined relative to these directions. Each wing 40 and 41 is preferably delta-shaped, has an oblique leading edge and a tailing edge perpendicular to direction X'1.

Preferably, the wing 40 and the inlet 31 are positioned at substantially the same height along direction Z1, the wing 40 being positioned in the direction X'1 relative to the inlet 31.

Thus, the wing 40 may divert a flow of drained liquids coming from the windscreen 4 or the gutter 29 when the vehicle 100 is at higher speeds than the cruise speeds, such as 110-130 kph, or in case the drain 30 is clogged.

Preferably, the wing 41 and the outlet 32 are positioned at the same height along direction Z1, the wing 41 being positioned in the direction X'1 relative to the outlet 32. Thus, the wing 41 may divert a flow of drained liquids outgoing from the outlet 32 in particular when the vehicle 100 is at higher speeds than the cruise speeds, such as 110-130 kph, and preferably also at lower speeds.

As a variant, only one of the wings 40 and 41 may be provided, or more than two lateral wings may be provided.

Figure 6:
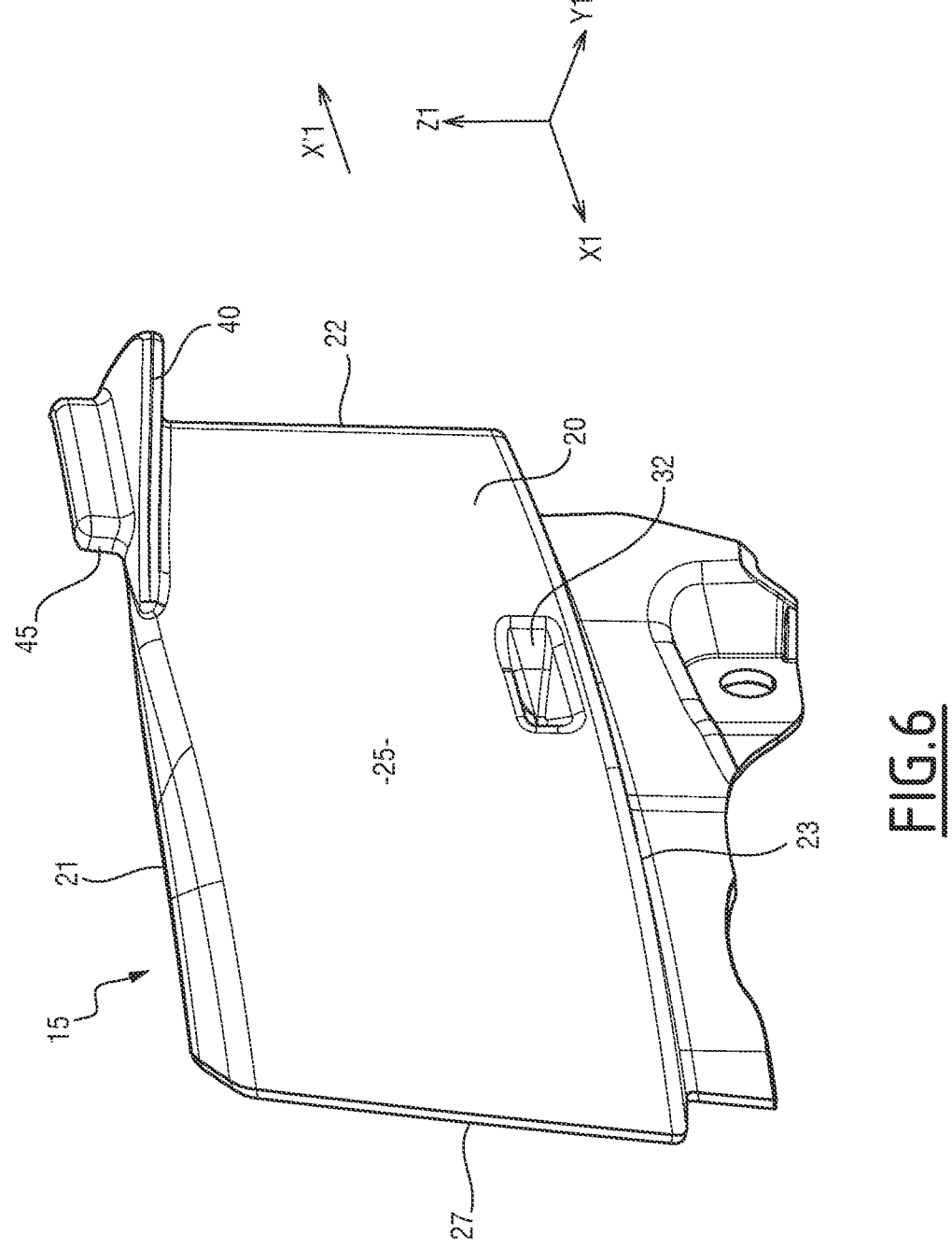
FIG. 6 is an exemplary partial perspective view of a corner part of a wiper panel assembly for the ground vehicle of FIG. 1, according to another example.
Figure 7:
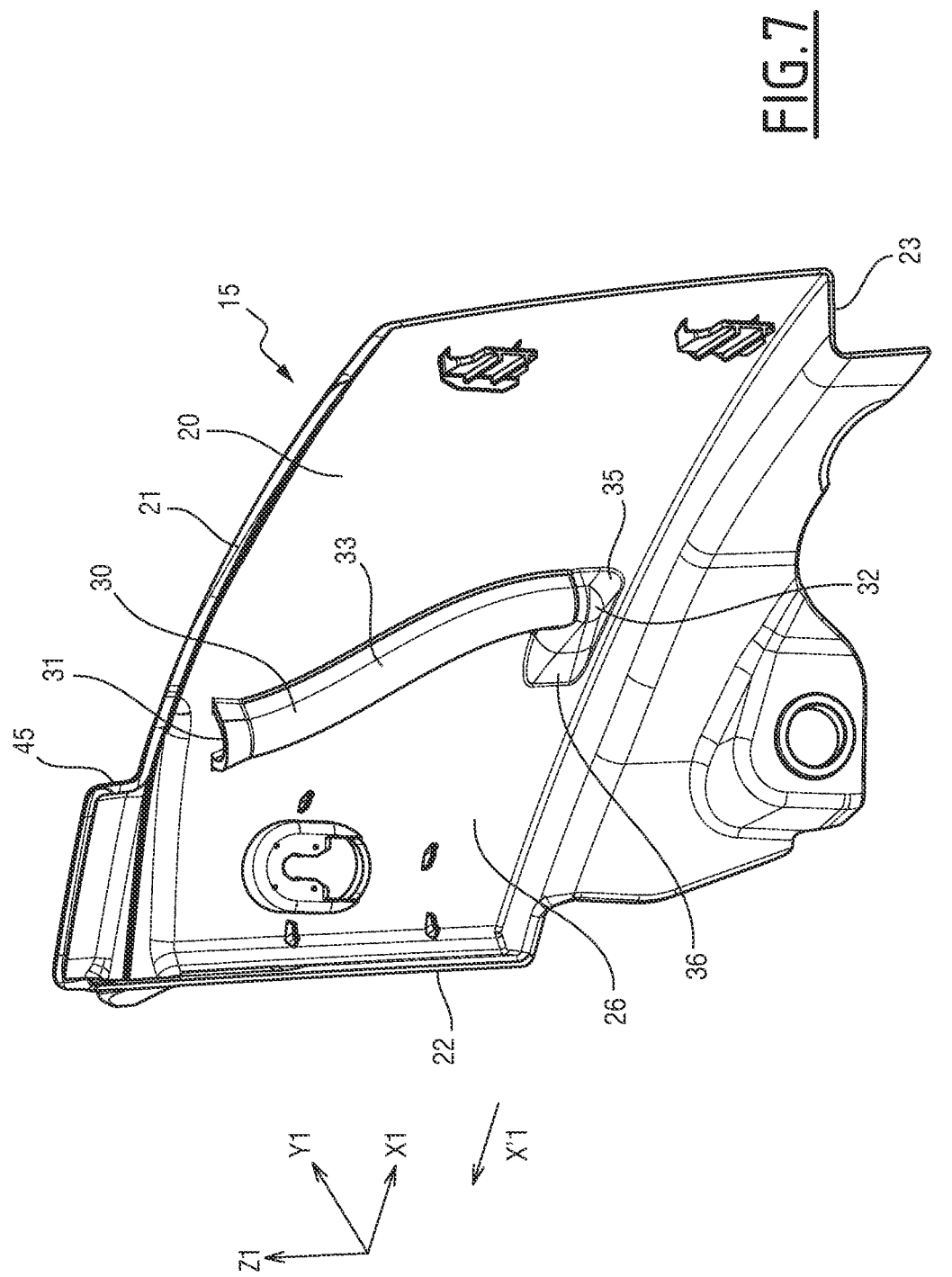
FIG. 7 is another exemplary partial perspective view of the corner part of FIG. 6.

FIGS. 6 and 7 show more detailed illustrations of the corner part 15, according to another example. Apart from the differences mentioned below, the exemplary corner part 15 of FIGS. 6 and 7 has the same features than the exemplary corner part 15 of FIGS. 2 to 5, identified with the same reference numbers.

The corner part 15 of FIGS. 6 and 7 comprises an outside panel 20, having an outside face 25 visible in FIG. 6 and an inside face 26 visible in FIG. 7, both extending substantially parallel to the upward direction Z1 and opposite to each other. The outside panel 20 has a top edge 21, delineating the faces 25 and 26 in direction Z1, a rear edge delineating the faces 25 and 26 in direction X'1 and a bottom edge 23 delineating the faces 25 and 26 in a direction opposite to direction Z1. As for this example, the outside panel 20 may constitute a separate part from the outside panel of the central part 14 of the wiper panel assembly 3. Thus, the outside panel may have a front edge 27 adjacent to the central part 14, delineating the faces 25 and 26 in the direction X1 and connecting the edges 21 and 23, opposite to the rear edge 22.

Although not illustrated, the corner part of FIGS. 6 and 7 may have an inside part with similar features than the inside part 24 shown in FIGS. 2 to 5, in particular including the gutter 29 and being assembled with the outside panel 20.

The corner part 15 of FIGS. 6 and 7 comprises a drain 30, best visible on FIG. 7. The drain 30 has an outlet 32, opening at the outside face 25, an inlet 31, located at the inside face 26 and opening at the inside face 26 in the upward direction Z1. The features of the drain 30 for the example of FIGS. 6 and 7 are the same than for the drain 30 of FIGS. 2 to 5, except that the drain of FIGS. 6 and 7 is integrally formed with the outside panel 20, instead of being partly formed by the outside panel 20 and the inner part.

Contrary to the corner part 15 of FIGS. 2 to 5, the corner part 15 of FIGS. 6 and 7 only has a single lateral wing 40, while the other lateral wing 41 is not provided.

Contrary to the corner part 15 of FIGS. 2 to 5, the corner part 15 of FIGS. 6 and 7 comprises a front wall 45, protruding from the top edge 21 substantially in the upward direction Z1. The front wall 45 constitutes a tooth that protrudes from the top edge 21. The front wall 45 is positioned close to the inlet 31 and is oriented transversally relative to the top edge 21, i.e., oriented substantially parallel to direction Y1. The front wall 45 is directed in the direction X1. Preferably, the wall 45 is positioned in the direction X'1 relative to the inlet 31 and at a short distance in the direction Z1 relative to the inlet 31, as shown in FIG. 7. Here the wall 45 is also positioned so as to protrude from the wing 40 in direction Z1. The wall 45 is preferably positioned along the lateral pillar 13. When the vehicle 100 is at cruise speed, a slight air pressure buildup may form locally at the front wall 45 as the front wall 45 interrupts the airflow caused by the displacement of the vehicle 100 in direction X1. The pressure buildup is obtained over and/or at the rear relative to the inlet 31. This higher pressure may promote introduction of the drained liquids into the inlet 31 at cruise speed, since the outlet 32 is at a lower pressure and draws the drained liquids.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A corner part for a wiper panel assembly for a ground vehicle, the corner part comprising:
   an outside panel, having an outside face and an inside face both extending substantially parallel to an upward direction of the corner part; and
   a drain, having:
   an outlet, opening at the outside face;
   an inlet, located at the inside face and opening at the inside face in the upward direction; and
   a channel, connecting the inlet to the outlet;
   wherein the outlet is located in a frontward direction relative to the inlet.

2. The corner part of claim 1, wherein the inlet is located in the upward direction relative to the outlet.

3. The corner part of claim 1, wherein, in a rearward direction perpendicular to the upward direction, the outside face and the inside face are delineated by a rear edge of the outside panel, and wherein the corner part further comprises a lateral wing, protruding from the outside face at the rear edge, being perpendicular to the outside panel and substantially parallel to the rearward direction.

4. The corner part of claim 1, wherein at least one of the inlet and outlet is funnel-shaped.

5. The corner part of claim 1, wherein an airfoil is formed at the outlet.

6. The corner part of claim 1, wherein, in the upward direction, the outside face and the inside face are delineated by a top edge of the outside panel and wherein the corner part further comprises a front wall, protruding from the top edge substantially in the upward direction, positioned close to the inlet and being oriented transversally relative to the top edge.

7. The corner part of claim 1, wherein the drain is formed integrally with the outside panel.

8. The corner part of claim 1, wherein the corner part comprises an inside part, assembled with the outside panel at the inside face thereof, the inside part forming at least one portion of the channel and of the inlet of the drain.

9. A vehicle cab comprising a wiper panel assembly comprising the corner part of claim 1, the vehicle cab further comprising a windscreen, wherein the corner part is adjacent to a bottom corner of the windscreen and the inlet of the corner part is located at the bottom corner of the windscreen.

10. A ground vehicle comprising the vehicle cab of claim 9.

11. The ground vehicle of claim 10, wherein the ground vehicle is a truck, a coach, a bus, or a van.

\* \* \* \* \*